(12) United States Patent
Bishop

(10) Patent No.: US 11,980,178 B1
(45) Date of Patent: May 14, 2024

(54) INSECT TRAP ASSEMBLY

(71) Applicant: Casey Bishop, Redding, CA (US)

(72) Inventor: Casey Bishop, Redding, CA (US)

( * ) Notice: Subject to any disclaimer, the term of this patent is extended or adjusted under 35 U.S.C. 154(b) by 59 days.

(21) Appl. No.: 18/070,138

(22) Filed: Nov. 28, 2022

(51) Int. Cl.
*A01M 1/02* (2006.01)
*A01M 1/04* (2006.01)

(52) U.S. Cl.
CPC .................. *A01M 1/04* (2013.01); *A01M 1/02* (2013.01)

(58) Field of Classification Search
CPC .................................. A01M 1/02; A01M 1/04
See application file for complete search history.

(56) References Cited

U.S. PATENT DOCUMENTS

| | | | |
|---|---|---|---|
| 1,772,989 A | 8/1930 | Emley | |
| 5,231,792 A | 8/1993 | Warner | |
| 7,694,456 B1 | 4/2010 | Curtis | |
| 9,179,662 B1 * | 11/2015 | Kort | ........................ A01M 1/10 |
| 9,961,891 B2 | 5/2018 | Berhardt | |

FOREIGN PATENT DOCUMENTS

DE 202014008949 U1 * 1/2015 .............. A01M 1/02

OTHER PUBLICATIONS

Trap Cap Fruit Fly Catching Lids Masontops.com downloaded (2023).
Fruit Fly Trap Caps Lee Valley Home downloaded (2022).

* cited by examiner

*Primary Examiner* — Richard G Davis
(74) *Attorney, Agent, or Firm* — Robert Moll

(57) ABSTRACT

An insect trap assembly including a vented top with a top rim adjacent an insect attractant container, a bottom tip in the container, and a surface between the top rim and the bottom tip, including vent(s) to emit attractant vapor to insects outside the assembly and entrance hole(s) connected to the vent(s), where the vapor and/or a light attracts insects to land and travel on the vent into entrance holes for capture in the container.

21 Claims, 8 Drawing Sheets

INSECT TRAP ASSEMBLY

BACKGROUND

The present invention relates to an insect trap assembly, including a vented top.

During the summer, people are enjoying a meal with family and friends then the uninvited guests show up. There is nothing more annoying than flying insects. Even though they are often small, flying insects, such as fruit flies, come in numbers. And they can persist in spoiling the entire meal drawn to the smell of food, plus can be evasive— disappearing then reappearing in a blink. After they land repeatedly on the fruit salad who wants to eat it? And one wonders is it even safe to eat given all the other places the insects have frequented that day?

Fruit flies are not just a problem outside. They may get through some window screens in home attracted to fruits and vegetables. Worse fruit flies lay eggs on or inside fruit (e.g., a banana or peach). And each female fruit fly can lay as many as 500 eggs at a time! For these reasons, it's important to have a solution to this problem, recognized there should be an effective way to rid your home and outdoor activity of fruit flies.

SUMMARY OF THE INVENTION

The present invention relates to an insect trap assembly with a vented top and an attractant container.

The vented top includes vent(s) to emit vapor to attract insects to land on the vented top, and travel along a vent to one or more entrance holes that are connected to the vent where the insects can enter the attractant container.

The vent(s) may be a variety of geometric shapes such as straight or curved slits or slots of the same or different sizes and shapes. In a feature, the vent(s) include vent ones that converge from the top to the bottom of the cone. In another feature, the vents are interleaved to increase the structural integrity of the vented cone top. Whatever the arrangement of the vent(s), they emit attractant vapor into the air surrounding the insect trap assembly, and a travel path into entrance hole(s) where the insects enter the attractant container.

In another feature, the vented top is adjacent or sealed to the container so that the insects cannot escape between the top and the attractant container. Thus, the vented top may or may not form an airtight seal to the container. The vented cone may include a grip edge with structures such as notches and/or protrusions that increase friction between a user's hand and the vented top to assist removing the top or securing it to the attractant container.

DETAILED DESCRIPTION

The following description includes the best mode of carrying out the invention. The detailed description illustrates the principles of the invention and should not be taken in a limiting sense. The scope of the invention is determined by reference to the claims. Each part is assigned its own part number throughout the specification and drawings. For brevity's sake, the character: "(s)" will be a suffix to a part name to indicate "at least one" of that part.

Figure 1:
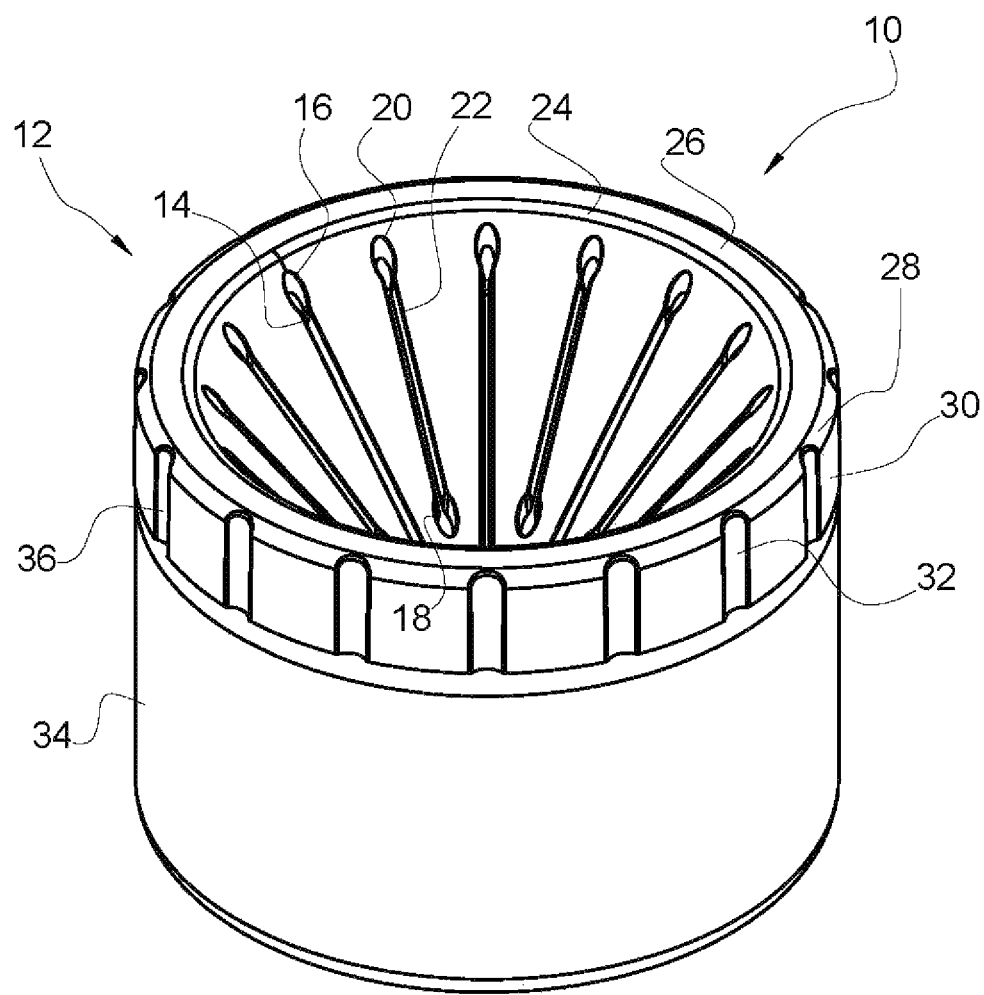
FIG. 1 is a perspective view of an embodiment of an insect trap assembly.

FIG. 1 is a perspective view of an insect trap assembly. In this embodiment, the insect trap assembly 10 includes an insect attractant container 34. Any known insect attractants (e.g., fruit juice) can fill the insect attractant container 34. The insect trap assembly 10 includes a vented cone top 12 adjacent the container 34. The vented cone top 12 can be made of metal, plastic, or ABS using known machining techniques, injection molding, or 3D printing.

The vented cone top 12 includes a top rim 26 that will seal (e.g., by gravity or threads) to the container 34. The seal only needs to be sufficiently tight to prevent insects from escaping from the insect trap assembly 10. The top rim 26, an inner bevel 24 and an outer bevel 28 smooth the surface to reduce chance a user will be cut or nicked in removing and securing the vented cone top 12 from and to the container 34. In an embodiment, the grip edge 30 includes notch(s) (e.g., notch 32 and 36) to increase friction between the user's hand when she or he removes and secures, for example, a threaded vented cone top 12.

The vented cone top 12 includes a bottom tip 46 (FIG. 3) that extends into the container 34. The vented cone top 12 has a cone shaped surface between the top rim 26 and the bottom tip 46 (FIGS. 1, 3 and 5) with vent(s) (e.g., vent 22) that emit attractant vapor to insects to land on the vents and travel to a connected entrance hole (e.g., upper hole 20) where they will enter the container 34.

Figure 2:
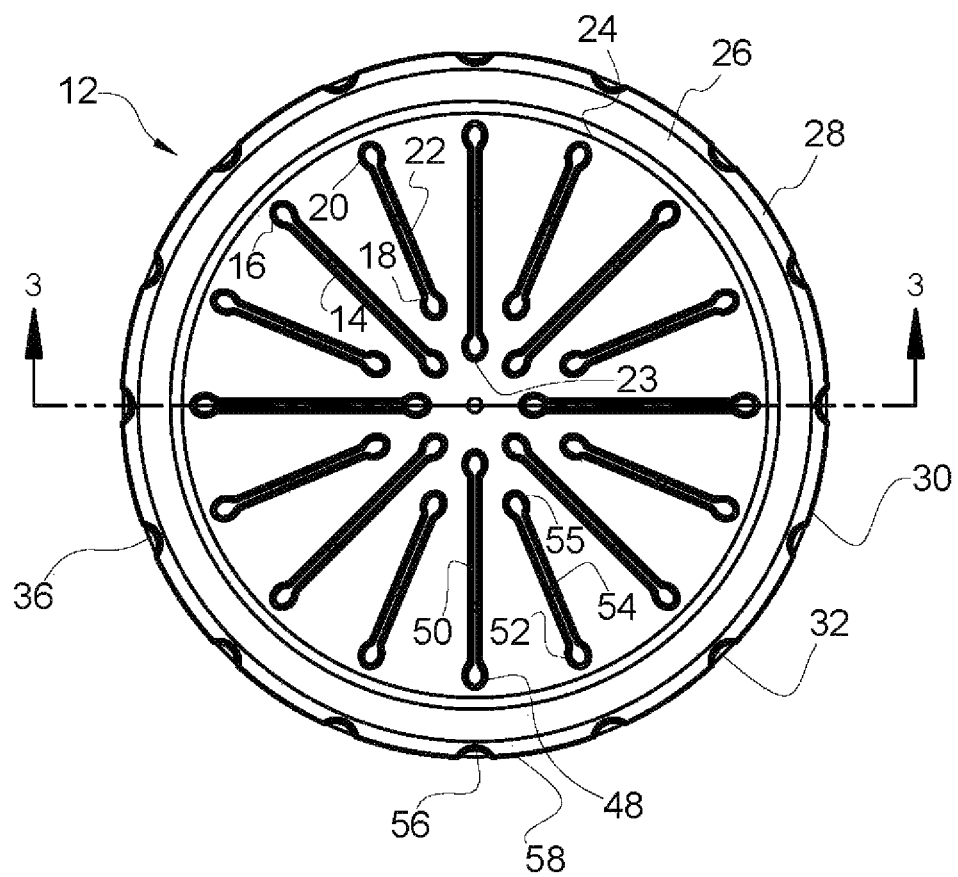
FIG. 2 is a top view of an embodiment of a vented cone top for the insect trap assembly.
Figure 3:
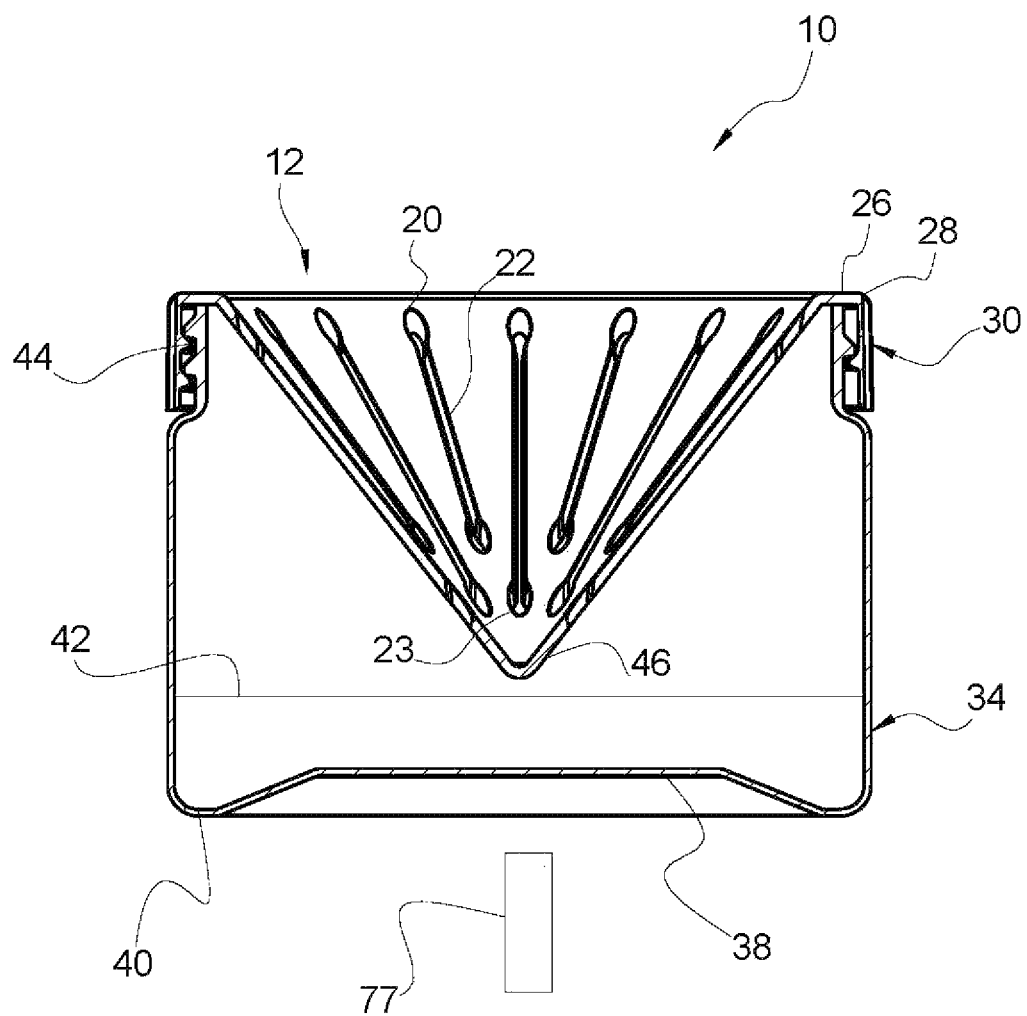
FIG. 3 is a cross-sectional view of the vented cone top taken along line 3-3 shown in FIG. 2.

FIG. 2 is a top view of the vented cone top 12 shown in FIG. 1. As shown, the vented cone top 12 includes short vent lines (e.g., vent lines 22, 54) and long vent lines (e.g., vent lines 14, 50) that are interleaved with respect to each other and converge from below the top rim 26 with inner bevel 24 and outer bevel 28 to above the bottom tip 46 (FIG. 3). Each vent line (e.g., vent line 22, 50, 54) has connected entrance holes (e.g., holes 18, 20; hole 48; holes 52, 55). In another embodiment, one or more of the vent lines (e.g., vent line 14) has a single connected entrance hole (e.g., lower hole 23 or upper hole 16). However, a vent line connected to multiple entrance holes (not just one hole) is believed to have a higher capture rate. FIG. 2 shows notches 32, 36, and 56 and various points 30 and 58 of the grip edge.

FIG. 3 is a cross-sectional view of an embodiment of the insect trap assembly 10 taken along line 3-3 shown in FIG. 2. The insect trap assembly 10 includes a vented cone top 12 and an insect attractant container 34 (FIG. 1). FIG. 3 shows vent line 22 and its entrance hole 20 and an entrance hole 23 close to a bottom tip 46 located above the level 42 of the attractant in the container 34.

FIG. 3 also shows the top rim 26, the outer bevel 28, the grip edge 30, and threads 44 between the vented cone top 22 and the container 34. Also shown is a light 77, such as a 40 Watt LED bulb, that transmits light through the center 38 and/or the bottom periphery 40 of the insect attractant container 40 to illuminate the insect attractant to further attract insects to the insect trap assembly 10. Thus, the parts shown in FIG. 3 retain their part numbers assigned in connection with FIG. 2.

Figure 4:
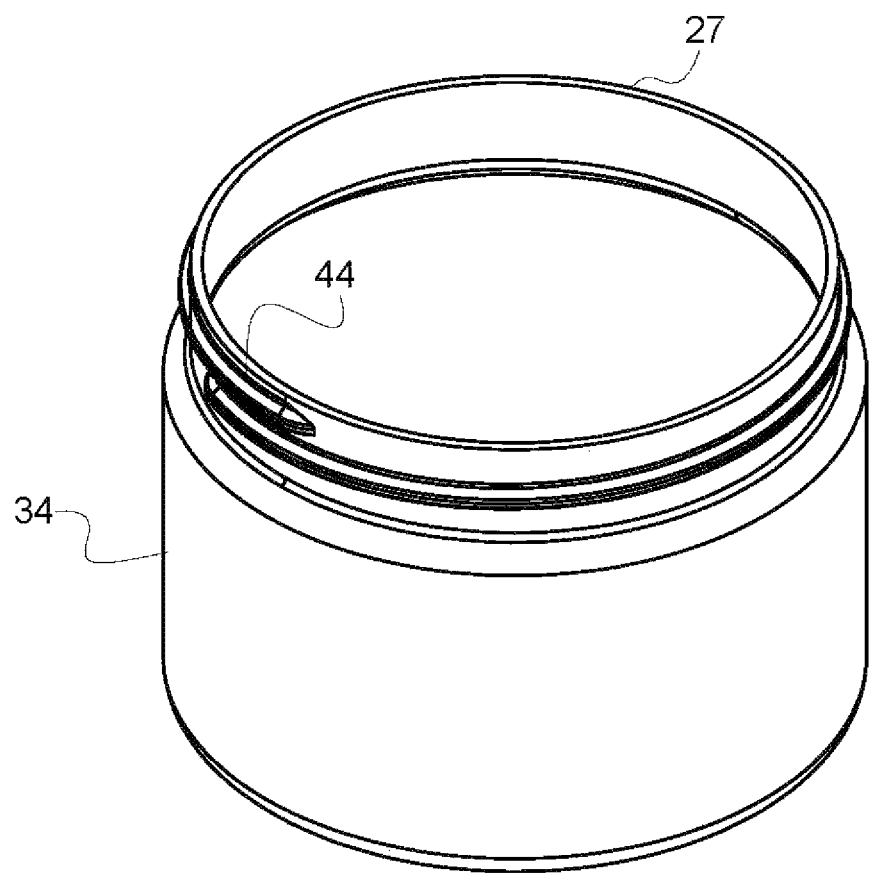
FIG. 4 is a perspective view of a suitable attractant container.

FIG. 4 is a perspective view of an attractant container suitable for the insect trap assembly 10. In this embodiment, the attractant container 34 is a glass or plastic jar with threads 44 to engage mating threads in the vented cone top 12 (FIG. 3). The glass or plastic allows transmission of light into the attractant container 34 shown in FIG. 3. Beside allowing the transmission of light, the glass jar allows the user to see how many insects are trapped and when it is time to dispose of the trapped insects in the attractant, clean the jar, and refill "fresh" attractant into the container 34.

Figure 5:
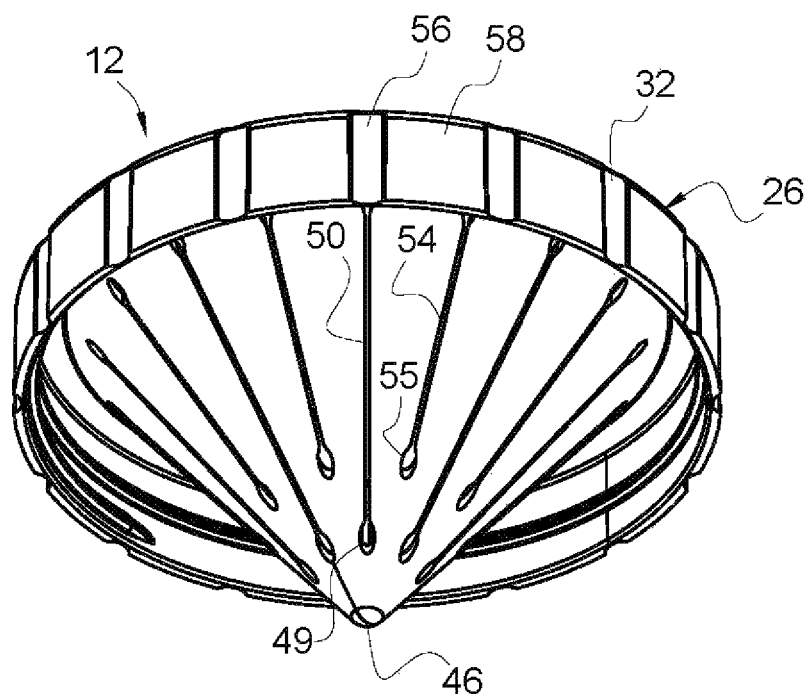
FIG. 5 is another perspective view of the vented cone top shown in FIGS. 1-3.

FIG. 5 is a perspective view of the vented cone top 12 shown in FIGS. 1-3. FIG. 5 shows a lower entrance hole 49, and the other parts shown in FIG. 5 retain their part numbers assigned in connection with FIGS. 1-3.

Figure 6:
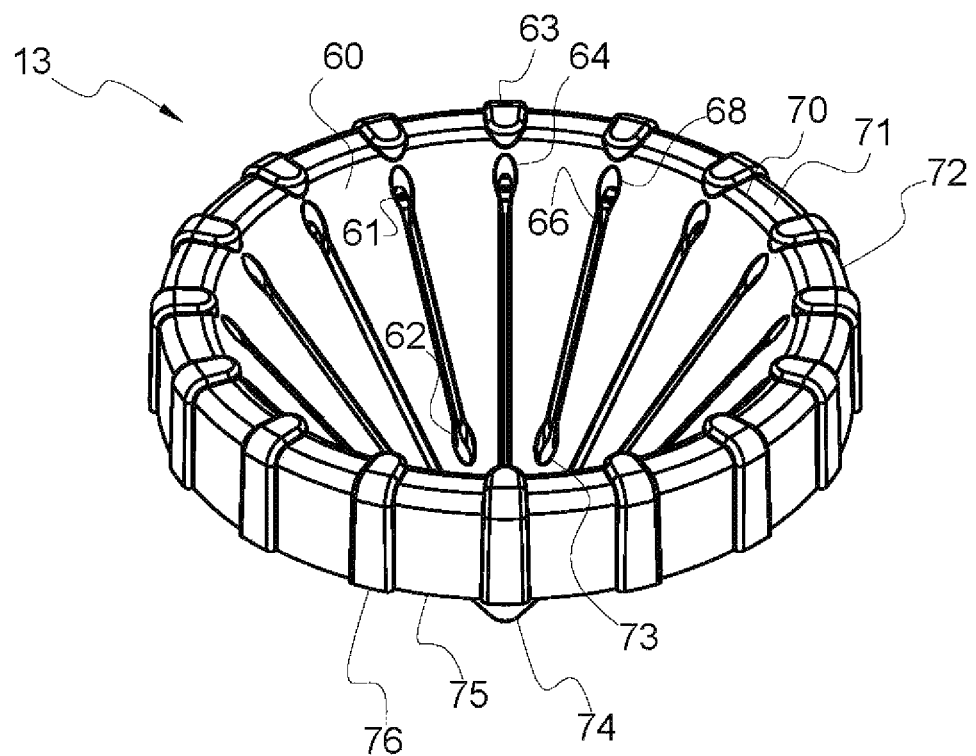
FIG. 6 is a perspective view of another embodiment of the vented cone top.

FIG. 6 is a perspective view of another embodiment of a vented cone top. As shown, the vented cone top 13 includes a grip edge 75 that includes protrusions (e.g., protrusions 63, 76) to increase friction between the grip edge 75 and a user's hand when the vented cone top 13 is removed. Similar to the embodiment shown in FIGS. 1-3 and 5, the vented cone top 13 includes a cone shaped surface (see e.g., surface 60) extending from the top rim 71 with an inner bevel 70 and an outer bevel 72 to the bottom tip 74. The cone surface has a set of vent lines (e.g., vent line 66) with connected entrance holes (e.g., entrance holes 68, 73). FIG. 6 illustrates other vent holes 61, 62, 64 connected to other vent lines.

Figure 7A:
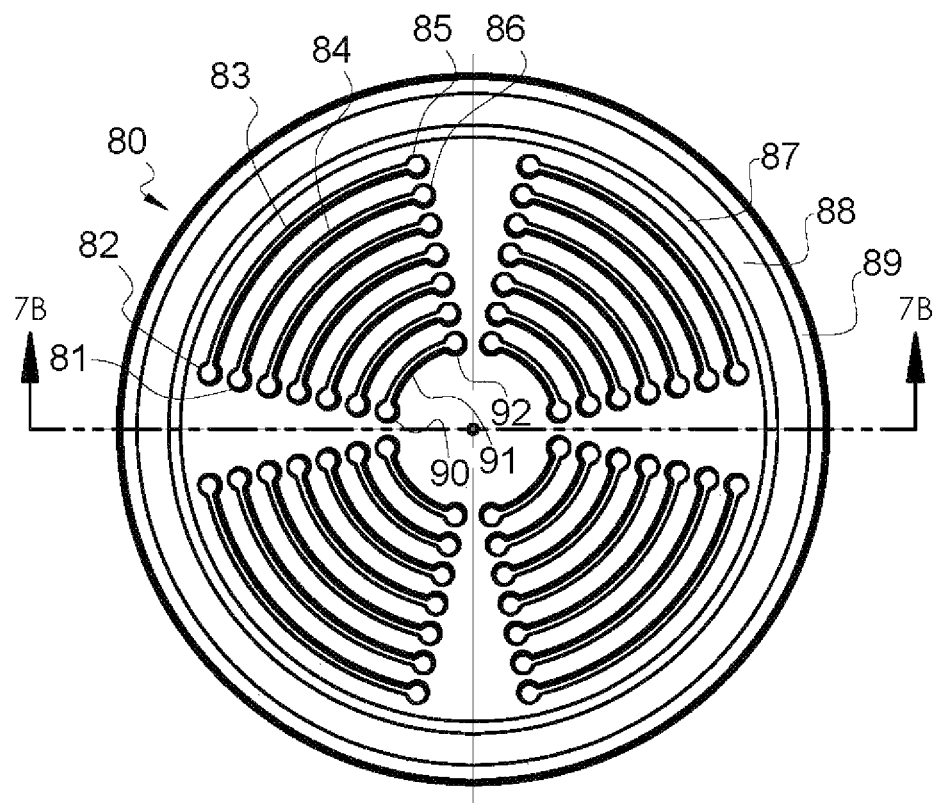
FIG. 7A is a top view of another embodiment of the vented cone top.
Figure 7B:
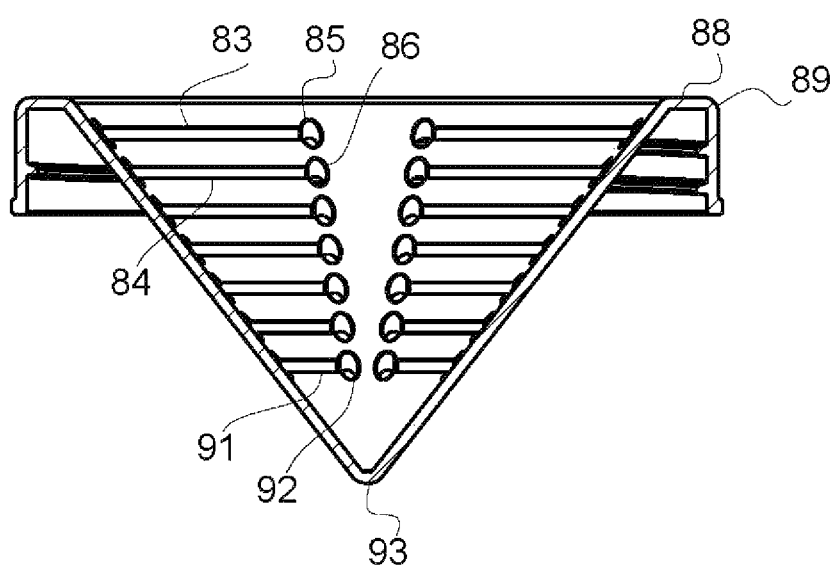
FIG. 7B is a cross-sectional view of the vented cone top taken along line 7B-7B shown in FIG. 7A.

FIG. 7A is a top view of another embodiment of a vented cone top. As shown, the vented cone top 80 includes a top rim 88, an inner bevel 87, and an outer bevel 89. The vented cone top 80 includes arc shaped vent(s) connected to entrance hole(s). As shown, the vented cone top 80 has concentrically arranged arc shaped vent(s) (e.g., vents 83, 84, and 91) connected, respectively, to entrance holes (e.g., holes 82, 85, holes 81, 86, and holes 90, 92). As shown, the arc shaped vents 91, 84, and 83 increase in length as the cone diameter expands from the bottom tip 93 (FIG. 7B) to the top rim 88. This increases the vents in the cone surface while retaining structural integrity of the vented cone top 80. FIG. 7B is a cross-sectional view of the vented cone top 80 taken along line 7B-7B shown in FIG. 7A. The parts shown in both FIGS. 7A-7B retain their part numbers.

Figure 8A:
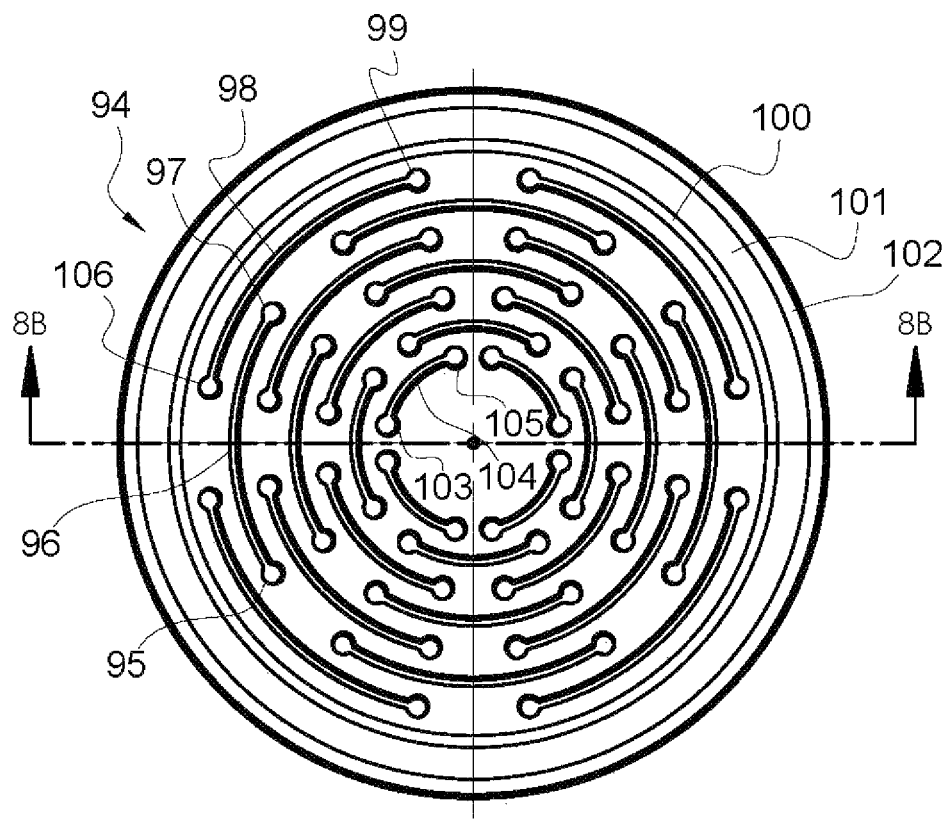
FIG. 8A is a top view of another embodiment of the vented cone top.
Figure 8B:
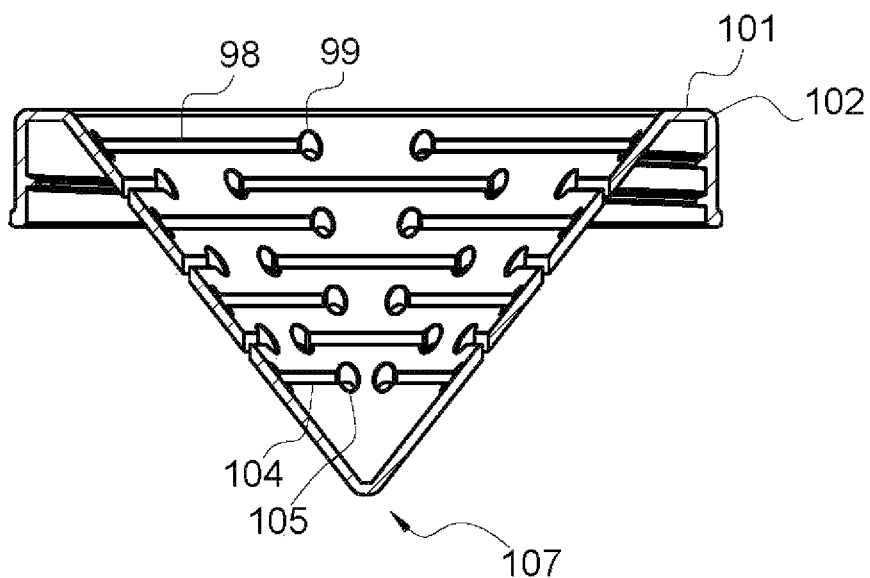
FIG. 8B is a cross-sectional view of the vented cone top taken along line 8B-8B shown in FIG. 8A.

FIG. 8A is a top view of another embodiment of a vented cone top. As shown, the vented cone top 94 includes a top rim 101, an inner bevel 100, and an outer bevel 102. The vented cone top 94 includes arc shaped vent(s) connected to entrance hole(s). As shown, the vented cone top 94 has staggered concentrically arranged arc shaped vent(s) (e.g., vents 96 and 98) connected, respectively, to entrance holes (e.g., holes 95, 97, and holes 99, 106). The arc shaped vents (e.g., vent 104 with entrance holes 103 and 105) increase in length as the cone diameter expands from the bottom tip 107 (FIG. 8B) to the top rim 101. This increases the vents in the cone surface while retaining structural integrity of the vented cone top 94. FIG. 8B is a cross-sectional view of the vented cone top taken along line 8B-8B shown in FIG. 8A. The parts shown in FIGS. 8A-8B retain their unique part numbers.

The specification describes and drawings illustrate an insect trap assembly with a vented top that is cone shaped. However, the insect attractant container and vented top may be of other three dimensional geometric shapes such as a box shape, shoe box shape, a hexagon, octagon, or a prism shape. The only requirement is the vented top seals (not necessarily be air-tight) to the container so the insects trapped in the attractant container cannot escape.

The specification describes and drawings show a set of vent lines that are straight and curves (e.g. arcs), but they could be a mix of straight and/or curved shapes. Moreover, much like a mountain trail, the vent lines could define a variety of paths (e.g., zig zag or curved) to entrance holes. In addition, the entrance holes shown at each end of the vent line could be also located between the ends. The function of a vent line is to direct an insect along a path to an entrance hole. Finally, the specification describes materials none of which are essential, but instead are believed as adequate to enable one of ordinary skill in this field to make and use the vented top and/or the insect trap assembly.

What is claimed:

1. An insect trap assembly, comprising:
   a container for an insect attractant; and
   a vented top adapted to rest on the container, wherein vented top includes a top rim adjacent to the container, a bottom tip, and a surface between the top rim and the bottom tip, wherein the surface includes vent(s) to emit attractant vapor to insects outside the assembly and entrance hole(s) connected to the vent(s), wherein the vapor attracts insects to land on the vent(s) for travel to the entrance hole(s) for capture in the container.

2. The insect trap assembly of claim 1, wherein the vented top is cone shaped and the vents include vent lines that converge from the top rim to the bottom tip.

3. The insect trap assembly of claim 2, wherein each vent line is a includes an upper entrance hole and a lower entrance hole.

4. The insect trap assembly of claim 2, wherein the vents lines include longer vent lines interleaved with shorter vent lines, whereby increasing the vent ones while retaining structural integrity of the vented cone top.

5. The insect trap assembly of claim 1, wherein the vents include arc shaped vent(s) that are concentric on the surface between the top rim and the tip.

6. The insect trap assembly of claim 5, wherein each arc shaped vent includes entrance hole(s).

7. The insect trap assembly of claim 5, wherein the vents lines include longer lines interleaved with shorter lines to increase the vent lines in the cone surface of the vented cone top while retaining structural integrity of the vented cone top.

8. The insect trap assembly of claim 1, wherein the top rim extends from the cone surface to a grip edge that assists securing and removing the vented cone top to and from the container.

9. The insect trap assembly of claim 8, wherein the grip edge includes notch(es) to increase friction between the grip edge and a user's hand.

10. The insect trap assembly of claim 8, wherein the grip edge includes protrusion(s) to increase friction between the grip edge and a user's hand.

11. The insect trap assembly of claim 1, further comprising a light adapted to illuminate the insect attractant container.

12. A vented top for insect capture, comprising:
    a vented top adapted to be adjacent to an attractant container, wherein vented top includes a top rim to seal the container, a bottom tip, and a surface between the top rim and the bottom tip, including vent(s) to emit attractant vapor to insects outside the assembly and entrance hole(s) connected to the vent(s), wherein the vapor attracts insects to land on the vent and travel to one of the entrance holes for capture in the container.

13. The vented top of claim 12, wherein the vented top is cone shaped and the vents include vent lines converging with respect to each other on the surface.

14. The vented top of claim 12, wherein each vent line includes an upper entrance hole and/or a lower entrance hole.

15. The vented top of claim 12, wherein the vents lines include longer lines interleaved with shorter lines to increase the number of vent lines in the cone surface while retaining the structural integrity of the vented cone top.

16. The vented top of claim 12, wherein the vents include arc shaped vents that are concentric with respect to each other on the cone surface.

17. The vented top of claim 16, wherein each arc shaped vent includes an entrance hole and/or a lower entrance hole.

18. The vented top of claim 16, wherein the arc shaped vents include longer arc shaped vents interleaved with shorter arch shaped vents, whereby increasing the number of arc shaped vents in the cone surface of the vented cone top while retaining structural integrity of the vented cone top.

19. The vented top of claim 12, wherein the top rim extends from the cone surface to a grip edge that assists securing and removing the vented cone top to and from the container.

20. The vented top of claim 19, wherein the grip edge includes notch(s) to increase the friction between the grip edge and a user's hand.

21. The vented top of claim 19, wherein the grip edge includes protrusion(s) to increase friction between the grip edge and a user's hand.

\* \* \* \* \*